Jan. 29, 1946.    J. A. MARKSTRUM    2,393,646
CUTTING TOOL
Filed June 8, 1942
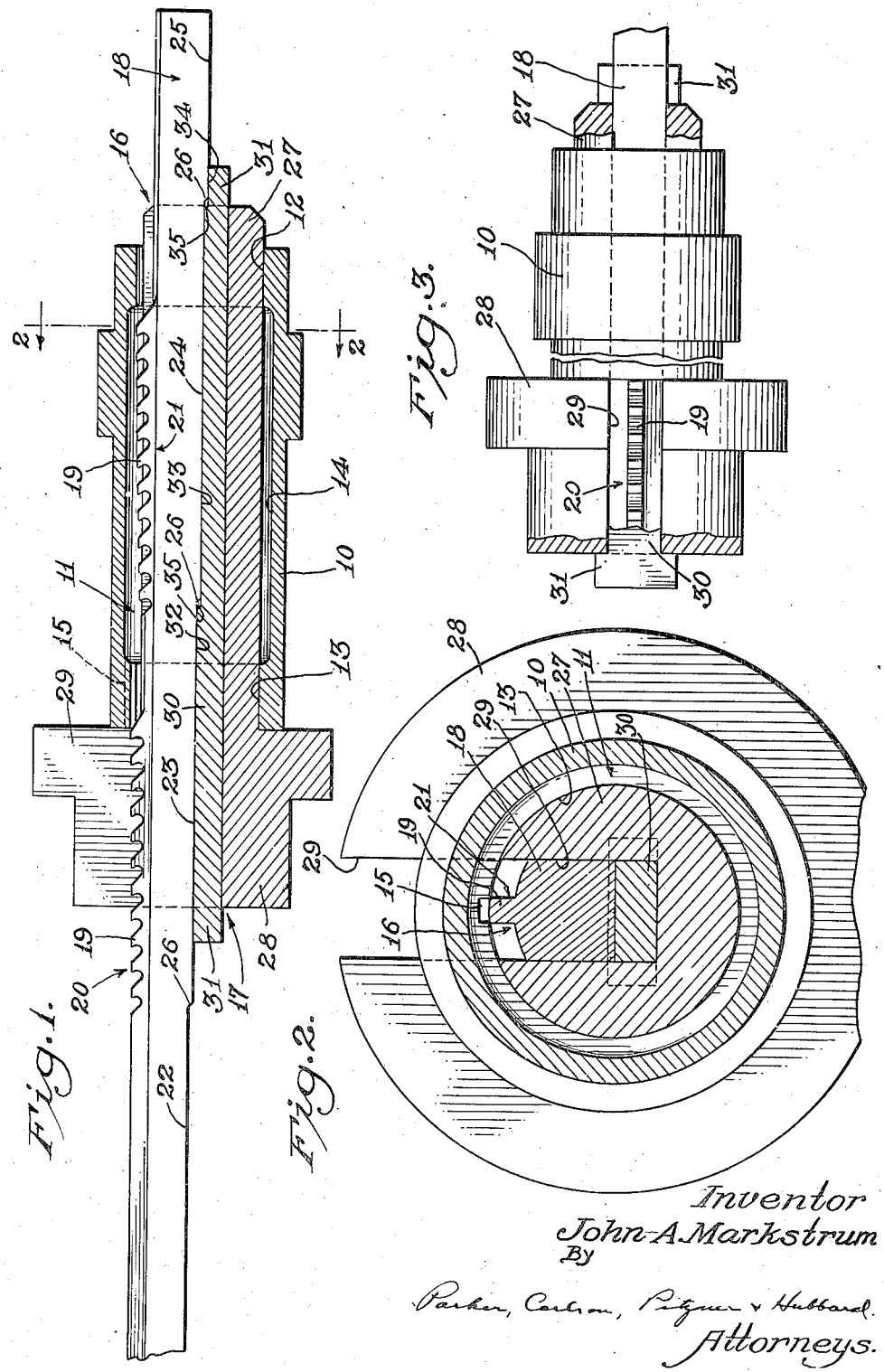
Inventor
John A. Markstrum
By
Parker, Carlson, Pigman & Hubbard.
Attorneys.

Patented Jan. 29, 1946

2,393,646

UNITED STATES PATENT OFFICE 2,393,646

CUTTING TOOL

John A. Markstrum, Detroit, Mich., assignor to Ex-Cell-O Corporation, Detroit, Mich., a corporation of Michigan Application June 8, 1942, Serial No. 446,232

11 Claims. (Cl. 90—33)

The invention relates to cutting tools, and more particularly to such tools as broaches in which the cutting operation is performed by drawing the tool across the work surface, usually an internal surface defined by a bore through the workpiece.

In operations of this character the cutting action of the tool has heretofore been continuous across the axial length of the bore surface of minimum diametrical or transverse dimensions and, so far as I am aware, it has not been possible with such a tool to cut less than the full axial length of such a surface. Axial or longitudinal splines or keyways which extended for less than the length of the bore have, prior to my invention, been formed by a slotting or comparable operation, which is slow and comparatively inaccurate.

A general aim of the present invention is to provide a new and improved tool of this character adapted quickly and with precision to make less than a complete cut longitudinally of an internal surface on a workpiece by a straight line movement of the tool across said surface.

Another object is to provide a novel tool of this character which embodies a broach type cutter and a cooperating guide member which supports the cutter in operative relation to the work surface, the cutter and guide member having coacting means for shifting the cutter transversely of its longitudinal travel at proper points to bring the cutters into engagement only with the work surface portion to be cut.

Other objects and advantages will become apparent in the following description and from the accompanying drawing in which:

Figure 1 is a view in axial section through a cutting tool embodying the features of the invention.

Fig. 2 is a transverse sectional view on an enlarged scale taken along the line 2—2 of Fig. 1.

Fig. 3 is a fragmentary view of the tool looking downwardly thereon as illustrated in Fig. 1.

While the invention is susceptible of various modifications and alternative constructions, I have shown in the drawing and will herein describe in detail, the preferred embodiment, but it is to be understood that I do not thereby intend to limit the invention to the specific form disclosed, but intend to cover all modifications and alternative constructions falling within the spirit and scope of the invention as expressed in the appended claims.

For purposes of disclosure the invention will be considered in connection with such a workpiece as a small sleeve, bushing or bearing in which a groove, spline or keyway is to be cut in one of two internal surfaces. It will be understood, however, that the present tool will be eminently suitable for cutting workpieces other than the one shown. The workpiece illustrated herein comprises a body 10 having a bore 11 provided with substantially similar internal surfaces 12, 13 at each end of restricted or minimum diameter or dimension separated by an internal recess 14. The required operation is to cut a groove or keyway 15 in one of the internal surfaces (herein the surface 13) but not in the other surface 12.

One form of device embodying my invention comprises a cutter (designated 16) which is a type of broach, and a guide and support therefor (generally indicated at 17). The cutter is an elongated rod-like element of generally rectangular cross-section having on one face thereof cutting elements or cutter teeth 19. As illustrated, the cutting elements are arranged in plural stages, there being two longitudinally spaced sets of teeth (designated 20, 21) provided for a reason to be hereinafter discussed. In each set the teeth from the leading one are stepped so that successive teeth will cut to a greater depth than a preceding tooth. The side of the rod opposite the teeth has a series of stepped surfaces 22, 23, 24 and 25 thereon arranged along the length of the rod to increase in effect the depth or tooth to base dimension of the cutter. The stepped surfaces are joined by sloping shoulders 26.

The guide and supporting means 17 comprises, in this instance, a body 27 dimensioned snugly to fit the bore 11 of the workpiece and to extend beyond the workpiece at each end thereof. The end of the body toward which the workpiece will be drawn by the action of the cutter (the left-hand end as shown) has an enlarged head 28 against which the end of the workpiece may abut. The body 27 is longitudinally traversed by a radial recess or groove 29 to receive the cutter and guide its longitudinal movements without side play. Seated in the groove 29 is a member 30 arranged to cooperate with the cutter in the longitudinal movement thereof to shift or displace the cutter transversely of its line of movement. The member 30 is an elongated plate shaped to fit snugly in the base of the groove and having at each of its ends a cross head 31 for engagement with the ends of the body to prevent relative longitudinal movement. The upper or outward face of the member 30 has a series of stepped surfaces 32, 33 and 34 thereon also connected by sloping shoulders 35. This surface formation is complemental to that of the cutter as defined by the surfaces 22 to 25, inclusive, and 26. The complemental surfaces 26, 35 may be said to act as cams for shifting or displacing the cutter teeth laterally outwardly during the longitudinal movement of the cutter through the workpiece. It will, of course, be evident that the inserted member 30 may be dispensed with and the stepped surfaces thereon formed on the base or root of the groove in the body 27. An inserted member is, however, preferred since it is simpler to form and because it may be replaced, if desired, by another member having an arrangement of stepped surfaces complemental to a different cutter.

The correlation of the several elements of the present device to each other and to the workpiece is important. The depth of the body groove 29 to the stepped surface of the inserted member 30 is sufficient to enable all of the sets of teeth to pass into the bore in the workpiece without engaging the surface which is not to be cut. The over-all length of each set of teeth is less than the length of the internal recess 14 in the workpiece. The depth of the groove or keyway 15 to be cut may determine the number of stages or sets of teeth. Thus, as in the illustrated embodiment, where the groove 15 is to be cut to a depth greater than can be properly cut by one set of teeth, the broaching operation will be performed in two stages. The first set of teeth 20 accordingly is arranged to cut the groove to half its depth and the set 21 to the finished dimension.

The complementary stepped surfaces 22 to 25, inclusive, on the cutter, and 32 to 34, inclusive, on the insert member 30 are so arranged that the cutter will be shifted transversely as the stepped surfaces thereon move from one to another of the stepped surfaces on the insert member. The spacing between the shoulders 26 and 35 is the same so that the cutter will be shifted uniformly throughout its length and parallelism thereof with the bore maintained. The arrangement, moreover, insures that the cutter will always be supported at least at two spaced points. The point at which each shift of the cutter occurs is so located that each set of cutter teeth will first move into the bore in the workpiece without engaging the surface 12 and be shifted transversely when the entire length of the set is opposite to the internal recess 14 in the workpiece. The cutter is thus shifted or displaced from a line in which it clears the work to a line in which it is disposed in operative alinement to the surface to be cut. A set of teeth subsequent to a preceding set will be so related thereto and to the stepped surfaces that its more advanced position with respect to the work will be obtained. The spacing between the plural sets of teeth is such that one set will have completed its cutting operation before the next set of teeth is shifted laterally. This relationship is clearly shown in Fig. 1 wherein the first set of teeth 20 has passed the surface 13 and has completed its cut as indicated by the full line portion of the groove 15, and the next set of teeth 21 (which will cut to the dotted line portion of the groove 15) is just approaching the point at which the cutter will again be shifted laterally as the surfaces 24, 25 on the cutter, respectively, move onto the surfaces 32, 33 on the member 30.

The present invention possesses many advantages. Longitudinal grooves or keyways can be rapidly formed with high precision in less than the entire internal surface of the workpiece by a broaching operation. The simple arrangement of stepped surfaces by which the broach is shifted or displaced laterally at predetermined points permits the cutting operation to be performed in stages, thus avoiding the necessity of using a broach having its teeth heavily stepped. The present device in operation is used in about the same manner as the ordinary broach. With the supporting body mounted in the face plate of a broaching machine and serving as a fixture, and with the cutter retracted to its initial or starting position relative to the supporting body, the workpiece is slipped over the free end of the cutter and body and brought into abutment with the head 28 on the body. Thereafter the broach is drawn through the workpiece, each series of cutters successively passing the surface 12 without engaging it, then being shifted laterally to the line of cut and finally performing its cutting operation on the surface 13. A high rate of production at a comparatively low cost is achieved by the present invention.

I claim as my invention:

1. In a cutting tool for making a longitudinal cut in one of a plurality of spaced internal surfaces on a workpiece, the combination of an elongated broach-type cutter having spaced sets of cutting teeth thereon arranged to cut successively to a predetermined depth, a support adapted to be seated on the workpiece and having a groove therein for receiving said cutter and guiding its longitudinal movements across the surface to be cut, the base of said groove having stepped surfaces thereon diminishing the depth of said groove, and complemental stepped surfaces on the face of said cutter which opposes said base operative as the cutter moves relative to said support to shift said cutter toward the surface to be cut, the relationship between the workpiece and the sets of cutter teeth and the complementary stepped surfaces being such that the sets of cutter teeth will clear the internal surfaces to be uncut and be shifted transversely into the space between the internal surfaces on the workpiece in advance of the surface to be cut.

2. In a device for making a longitudinal cut in one of a plurality of spaced surfaces in a workpiece, the combination of a cutter having teeth thereon arranged in longitudinally spaced sets, each set being arranged to make a cut to predetermined depth as the cutter longitudinally traverses the surface to be cut, a cutter support adapted to be seated on the work and having a cutter receiving groove therein slidably supporting said cutter, and a member removably seated in said groove providing a base surface engaged by the side of said cutter opposite the teeth, said member and said side of the cutter having stepped surfaces thereon arranged to shift the cutter laterally toward the surface to be cut.

3. In a device for making a longitudinal cut in one of a plurality of internal surfaces in a workpiece which surfaces are spaced apart by an internal recess, the combination of a cutter of the broach type having a set of cutting teeth extending longitudinally of the cutter, the length of said set of teeth being less than the internal recess in the workpiece, stationary means for supporting said cutter for longitudinal movement across the surface to be cut, said cutter being movable longitudinally relative to said last mentioned means in a forward cutting stroke, and means operative in such longitudinal movement for shifting said cutter laterally when said cutting teeth are opposite said recess to dispose said teeth in operative alinement with the surface to be cut.

4. In a device for making a longitudinal cut in one of a plurality of internal surfaces in a workpiece which surfaces are spaced apart by an internal recess, the combination of a cutter of the broach type having a set of cutting teeth extending longitudinally of the cutter, the length of said set of teeth being less than the internal recess in the workpiece, stationary guide means for supporting said cutter for relative longitudinal movement in a cutting stroke across the surface to be cut, and cam means for shifting said cutter by such movement from a line of longitudinal movement in which said teeth clear said internal surfaces to a position in which said teeth extend into said recess and are located in operative alinement with the internal surface to be cut.

5. In a cutting device of the broach type adapted to be drawn through a bore to make a longitudinal cut in one portion of an internal surface in said bore, the combination of a cutter having a longitudinal series of cutting elements thereon, stationary guide means for supporting said cutter for movement in a cutting stroke through a portion of said bore with said cutting elements in spaced relation to the portion of the internal surface which is not to be cut, and means operable as an incident to the movement of said cutter relative to said guide means for shifting said cutter at an intermediate point in said stroke to engage said cutting elements operatively with the portion of the internal surface to be cut.

6. A plural stage broach tool for cutting a groove or the like in one of two internal surfaces in a bore, said surfaces being of substantially the same diameter, said tool having in combination an elongated member having longitudinally spaced sets or stages of cutting elements thereon, said tool being dimensioned to pass through said bore without engaging said internal surfaces, stationary guide means for supporting said tool initially out of contact with said surfaces, and coacting means on said tool and said guide means for progressively shifting said tool laterally after each of said sets of cutting elements has cleared one surface and before it reaches the surface to be cut.

7. A broach tool having, in combination, an elongated body formed in one side from end to end with a longitudinal guide groove, a stationary guide member seated in the bottom of said groove and extending longitudinally therethrough, cross heads on the ends of said member engaging the outer ends of said body to constrain said member against longitudinal movement, the outer side of said member being formed with spaced longitudinal parallel stepped surfaces respectively connected at their contiguous ends by inclined cam shoulders, and an elongated broach tool slidably disposed in said groove against said member and formed on the outer side with a longitudinally disposed set of cutting teeth of progressively increasing cutting amplitude and facing longitudinally to take a cut upon movement of said tool in a forward direction, the inner side of said tool being formed with longitudinally spaced parallel stepped guide surfaces slidably engaging said first mentioned surfaces and connected at their contiguous ends by inclined cam shoulders adapted for engagement with said first mentioned shoulders to project said teeth laterally into cutting position at a predetermined point in movement of said tool in said forward direction while maintaining a guide support for said tool by said member at at least two spaced points.

8. A broach tool having, in combination, an elongated body formed in one side from end to end with a longitudinal guide groove, a stationary guide member seated in the bottom of said groove and extending longitudinally therethrough, the outer side of said member being formed with spaced longitudinal parallel stepped surfaces respectively connected at their contiguous ends by inclined cam shoulders, and an elongated broach tool slidably disposed in said groove against said member and formed on the outer side with a longitudinally disposed set of cutting teeth of progressively increasing cutting amplitude and facing longitudinally to take a cut upon movement of said tool in a forward direction, the inner side of said tool being formed with longitudinally spaced parallel stepped guide surfaces slidably engaging said first mentioned surfaces and connected at their contiguous ends by inclined cam shoulders adapted for engagement with said first mentioned shoulders to project said teeth laterally into cutting position at a predetermined point in the forward movement of said tool.

9. A broach tool having, in combination, a stationary guide member provided on one side with spaced longitudinal parallel stepped guide surfaces respectively connected at their contiguous ends by inclined cam shoulders, and an elongated broach tool slidably disposed at one side against said member and formed on the other side with a longitudinally disposed set of cutting teeth of progressively increasing cutting amplitude and facing longitudinally to take a cut upon movement of said tool in a forward direction, said one side of said tool being formed with longitudinally spaced parallel stepped guide surfaces slidably engaging said first mentioned surfaces and connected at their contiguous ends by inclined cam shoulders adapted for cam engagement with said first mentioned shoulders to project said teeth laterally into cutting position at a predetermined point in the forward cutting movement of said tool.

10. A broach having, in combination, an elongated member adapted for longitudinal movement and provided on one side with a longitudinally disposed set of cutting teeth of progressively increasing cutting amplitude toward the trailing end and facing toward the opposite end to take a cut upon movement of said member in a forward direction, the opposite side of said member being provided with longitudinally spaced parallel stepped guide surfaces of progressively increasing height toward the trailing end and connected at their contiguous ends by inclined cam shoulders.

11. A broach having, in combination, an elongated member adapted for longitudinal movement and provided on one side with two longitudinally spaced sets of cutting teeth, with the teeth of each set of progressively increasing cutting amplitude toward the trailing end and facing toward the opposite end to take a cut upon movement of said member in a forward direction, the opposite side of said member being provided with longitudinally spaced parallel stepped guide surfaces of progressively increasing height toward the trailing end and connected at their contiguous ends by inclined cam shoulders.

JOHN A. MARKSTRUM.